US012017378B1

(12) United States Patent
Chang

(10) Patent No.: US 12,017,378 B1
(45) Date of Patent: Jun. 25, 2024

(54) RIVING KNIFE ASSEMBLY

(71) Applicant: Chin-Chin Chang, Taichung (TW)

(72) Inventor: Chin-Chin Chang, Taichung (TW)

( * ) Notice: Subject to any disclaimer, the term of this patent is extended or adjusted under 35 U.S.C. 154(b) by 0 days.

(21) Appl. No.: 18/109,288

(22) Filed: Feb. 14, 2023

(51) Int. Cl.
*B27G 19/08* (2006.01)
*B27G 19/02* (2006.01)

(52) U.S. Cl.
CPC .................................... *B27G 19/08* (2013.01)

(58) Field of Classification Search
CPC ........ B27G 19/08; B27G 19/02; B27B 5/222; B27B 5/29; B27B 5/243; B27D 45/061; F16B 41/00; F16B 5/0225; F16B 39/34; F16B 35/041; Y10T 83/2077; Y10T 83/888; Y10T 83/7734; Y10T 83/932; Y10T 83/773
USPC ........ 83/102.1, 428, 477.2, 397, 471.2, 438, 83/823; 144/154.5, 350, 384.391, 427
See application file for complete search history.

(56) References Cited

U.S. PATENT DOCUMENTS 7,475,622 B1 * 1/2009 Chang .................... B27G 19/08 83/477.2
2007/0113714 A1 * 5/2007 Burke .................... B27G 19/02 83/477.2
2008/0022826 A1 * 1/2008 Weir ...................... B27G 19/02 83/478
2010/0126324 A1 * 5/2010 Liu ........................ B27G 19/08 83/438
2011/0056358 A1 * 3/2011 Liao ....................... B27G 19/08 83/698.11
2011/0072943 A1 * 3/2011 Chen ...................... B27G 19/08 83/102.1
2011/0259165 A1 * 10/2011 Chiang ..................... B27B 5/29 83/102.1
2015/0107427 A1 * 4/2015 Gass ...................... B27G 19/08 83/477.1
2016/0067880 A1 * 3/2016 Frolov ................... B27G 19/02 83/102.1

* cited by examiner

*Primary Examiner* — Ghassem Alie
(74) *Attorney, Agent, or Firm* — WPAT, P.C

(57) ABSTRACT

A riving knife assembly has a holder, a clamping plate, a riving knife body disposed between the holder and the clamping plate, a handle pivotally connected to the clamping plate, and a fastener assembly connecting the holder, the riving knife body, the clamping plate, and the handle. The handle has a curved hole and a stage surrounding the curved hole and having a lower step and an upper step. The fastener assembly includes a connecting rod, a positioning flange, and an elastic pressing element. When the handle is in a locked position, the elastic pressing element is located between the positioning flange and the upper step of the stage to clamp the riving knife body. When the handle is in an unlocked position, the elastic pressing element is located between the positioning flange and the lower step of the stage to release the riving knife body.

16 Claims, 12 Drawing Sheets

RIVING KNIFE ASSEMBLY

BACKGROUND OF THE INVENTION

1. Field of the Invention

The present invention relates to a safety device for a table cutting machine, and more particular to a riving knife assembly.

2. Description of Related Art

A riving knife is a safety device installed on a table saw and disposed behind a saw blade. When a workpiece passes through the rotating saw blade, the riving knife prevents a kerf on a workpiece from getting close onto the teeth of the rotating saw blade and prevents the workpiece from being kicked back by the saw blade to impact an operator operating the table saw.

The riving knife is usually fixed relative to the saw blade in position. A protective cover may be attached to the riving knife to shield the saw blade for safety. When making a through cut, it is safer that a top of the riving knife is higher than a top of the saw blade, hereby reducing the exposure of a back of the saw blade. However, when making a non-through cut, if the top of the riving knife is higher than the top of the saw blade, the riving knife may obstruct the workpiece from passing through the saw blade.

To overcome the shortcomings, the present invention tends to provide a riving knife assembly to mitigate or obviate the aforementioned problems.

SUMMARY OF THE INVENTION

The main objective of the invention is to provide a riving knife assembly wherein a position of a riving knife body thereof relative to a saw blade can be adjusted.

A riving knife assembly comprises a holder, a clamping plate disposed at a side of the holder, a riving knife body disposed between the holder and the clamping plate, a handle disposed at a side of the clamping plate facing away from the holder, and a fastener assembly connected to the holder, the riving knife body, the clamping plate, and the handle. The riving knife body has a knife slot formed through two opposite sides of the riving knife body. The handle is pivotally connected to the clamping plate, is pivotable around a pivot axis and relative to the clamping plate, and has a first side, a second side, a curved hole, and a stage. The second side is opposite to the first side of the handle. The curved hole extends around the pivot axis and has a locked end and an unlocked end. The stage surrounds the curved hole, is formed at a first side of the handle, and has a lower step being adjacent to the unlocked end of the curved hole and an upper step being adjacent to the locked end of the curved hole. A thickness from the upper step to the second side of the handle is larger than a thickness from the lower step to the second side of the handle. The fastener assembly comprises a connecting rod, a positioning flange, and an elastic pressing element. The connecting rod is mounted through the holder, the knife slot of the riving knife body, the clamping plate, and the curved hole of the handle. The positioning flange is disposed at an end of the connecting rod and is disposed at one of the first side and the second side of the handle that faces away from the holder. The elastic pressing element is sleeved on the connecting rod, is disposed between the positioning flange and the handle, and is configured to press the handle toward the clamping plate. The handle has a locked position and an unlocked position. When the handle is in the locked position, the fastener assembly is located at the locked end of the curved hole of the handle, and the elastic pressing element is located between the positioning flange and the upper step of the stage of the handle. When the handle is in the unlocked position, the fastener assembly is located at the unlocked end of the curved hole of the handle, and the elastic pressing element is located between the positioning flange and the lower step of the stage of the handle.

Other objects, advantages and novel features of the invention will become more apparent from the following detailed description when taken in conjunction with the accompanying drawings.

BRIEF DESCRIPTION OF THE DRAWINGS

FIG. 3 is an exploded perspective view of the riving knife assembly in

FIG. 1;

DETAILED DESCRIPTION OF PREFERRED EMBODIMENT

Figure 1:
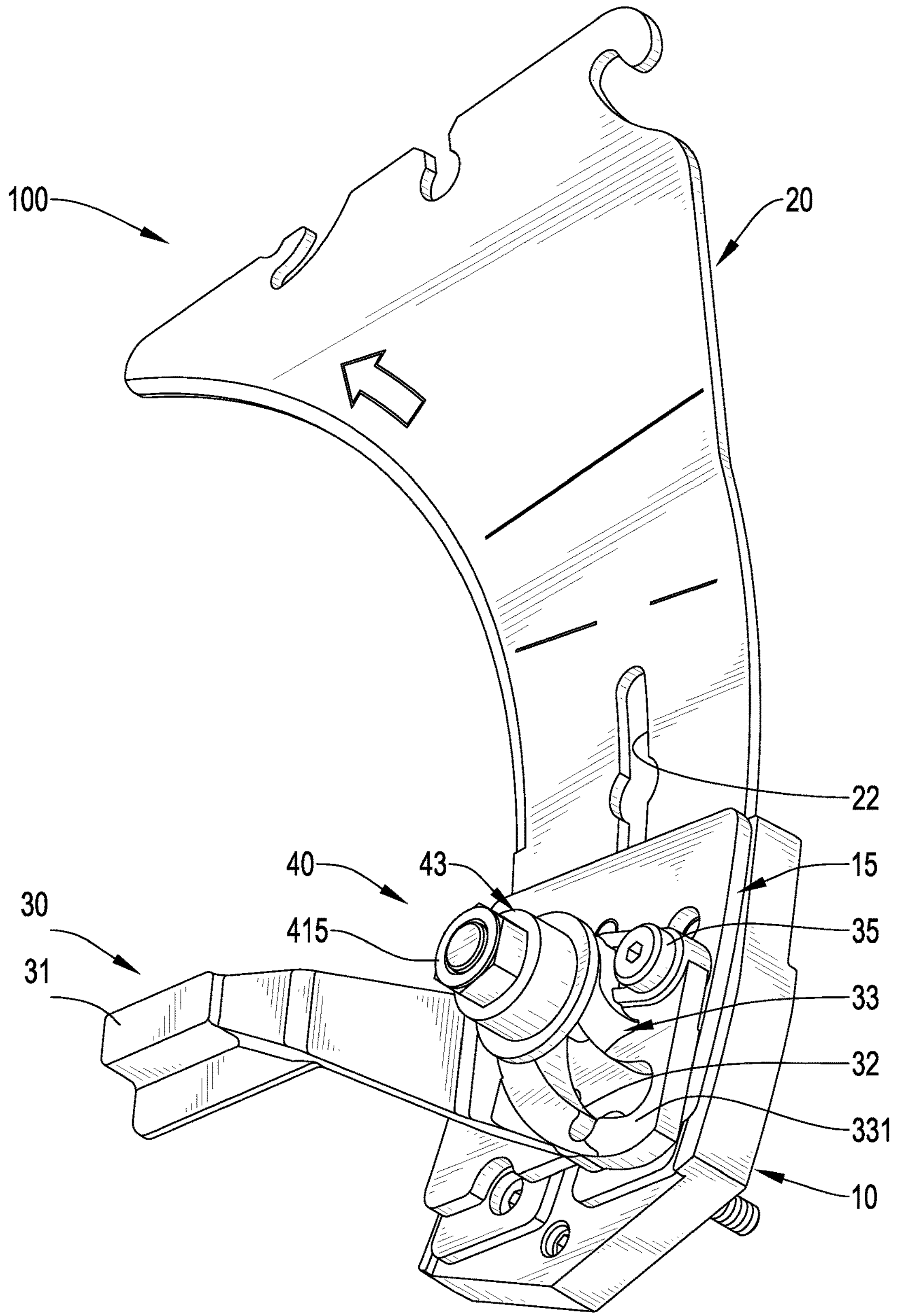
FIG. 1 is a perspective view of a riving knife assembly in accordance with the present invention.
Figure 2:
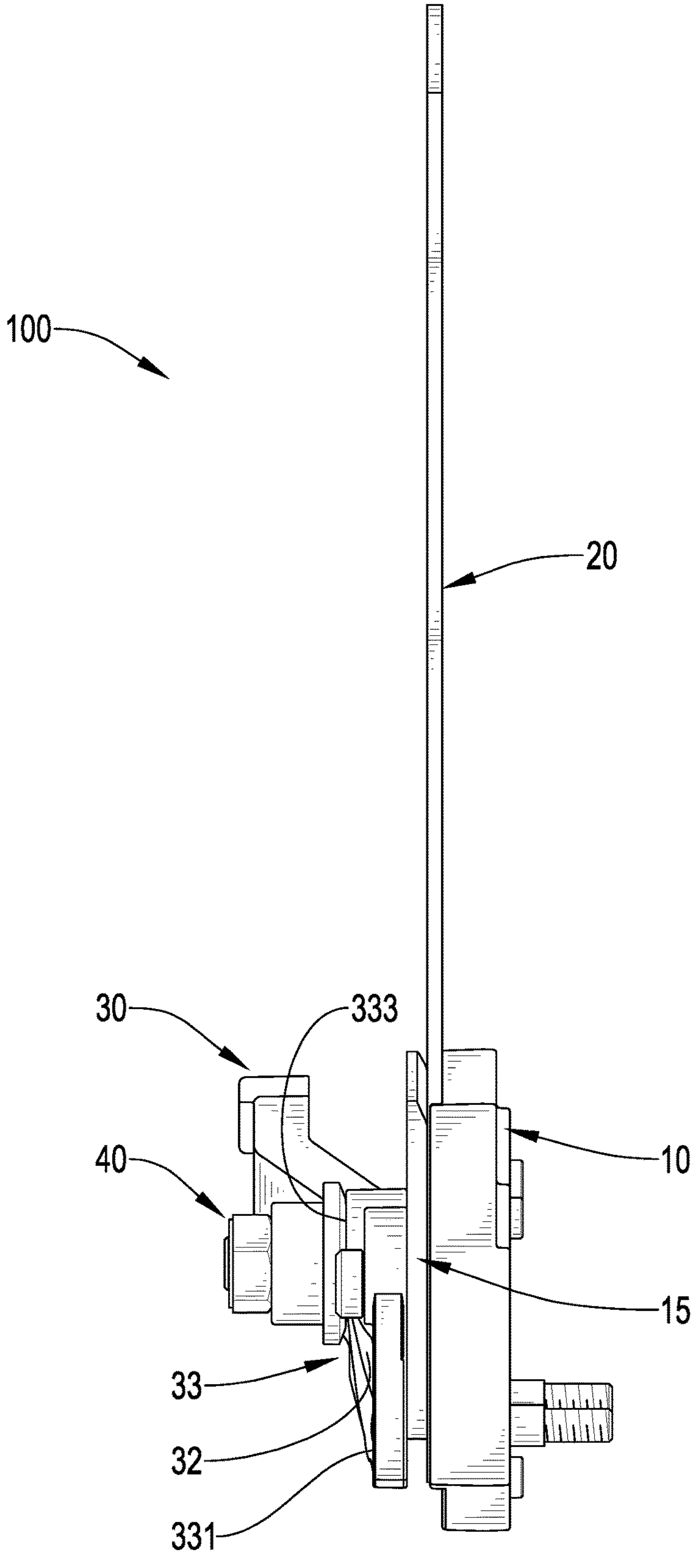
FIG. 2 is a side view of the riving knife assembly in FIG. 1.
Figure 12:
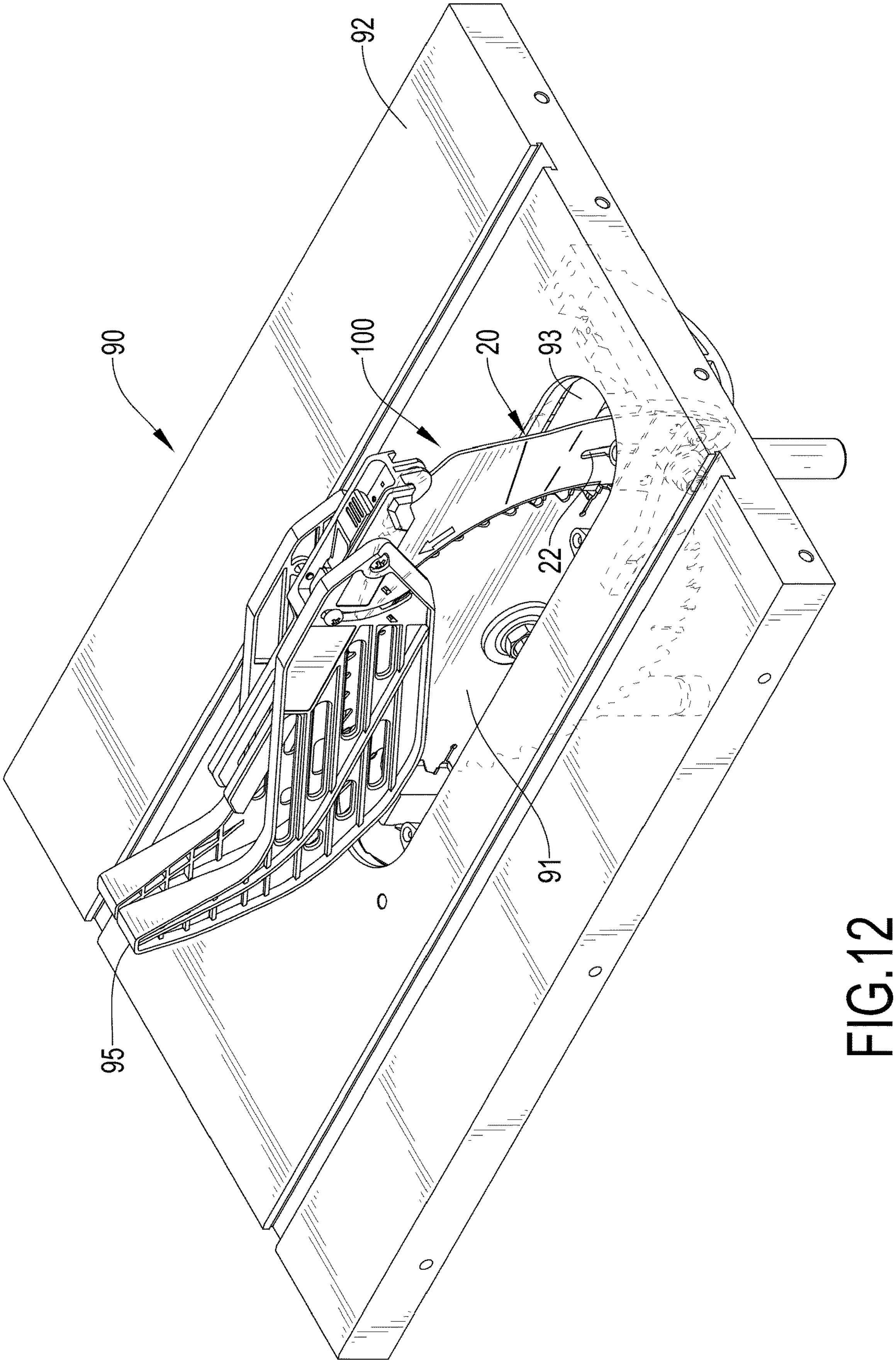
FIG. 12 is an operational perspective view of the riving knife assembly in FIG. 1, shown installed to a table saw.

With reference to FIGS. 1 and 12, a riving knife assembly 100 in accordance with the present invention is configured to be installed to a table saw 90 as shown in FIG. 12, is disposed behind a saw blade 91, and is connected to a frame 93 for holding the saw blade 91. A protective cover 95 may be attached to the riving knife assembly 100 to shield the saw blade 91 for safety.

With reference to FIGS. 1 to 4, and 8, the riving knife assembly 100 comprises a holder 10, a clamping plate 15, a riving knife body 20, a handle 30, and a fastener assembly 40.

With reference to FIGS. 1 to 3, 8, and 12, the holder 10 is configured to be connected to the frame 93 of the table saw 90. The clamping plate 15 is disposed at a side of the holder 10. The riving knife body 20 is disposed between the holder 10 and the clamping plate 15. The handle 30 is disposed at a side of the clamping plate 15 facing away from the holder 10. The fastener assembly 40 connects the holder 10, the riving knife body 20, and the handle 30. The protective cover 95 is attached to a top of the riving knife body 20.

With reference to FIGS. 1, 3, 4, and 12, the riving knife body 20 has a knife slot 22 being curved, formed through two opposite sides of the riving knife body 20, and extending to a bottom of the riving knife body 20.

With reference to FIGS. 1, 3, 4, 8, and 11, the handle 30 is pivotally connected to the clamping plate 15, and is pivotable around a pivot axis 301 and relative to the clamping plate 15. A pivot 35 is mounted through the handle 30 along the pivot axis 301 and is connected to the clamping plate 15. The handle 30 includes a first side, a second side, a curved hole 32, and a stage 33. The first side and the second side are opposite to each other, and the first side faces away from the holder 10. The curved hole 32 is formed through the handle 30, extends around the pivot axis 301, and has a locked end and an unlocked end. The stage 33 surrounds the curved hole 32. The stage 33 is formed at the first side of the handle 30 and is disposed away from the clamping plate 15. The stage 33 has a lower step 331, a slope 332, and an upper step 333. The upper step 333 is thicker than the lower step 331. The lower step 331 and the upper step 333 are respectively adjacent to the unlocked end and the locked end of the curved hole 32. The slope 332 is connected between the upper step 333 and the lower step 331 and gradually inclines from the upper step 333 to the lower step 331. A thickness from the upper step 333 to the second side of the handle 30 is larger than a thickness from the lower step 331 to the second side of the handle 30. A distance from the clamping plate 15 to the upper step 333 is larger than a distance from the clamping plate 15 to the lower step 331. The handle 30 may include a holding portion 31 formed at a side thereof for a user to hold and rotate the handle 30.

With reference to FIGS. 1, 3, 8, and 9, the fastener assembly 40 comprises a connecting rod 41, a positioning flange 415, and an elastic pressing element 43. The connecting rod 41 is mounted through the holder 10, the knife slot 22 of the riving knife body 20, the clamping plate 15, and the curved hole 32 of the handle 30. The positioning flange 415 is disposed at an end of the connecting rod 41 and is disposed at a side of the handle 30 facing away from the holder 10. The positioning flange 415 may be a nut threaded on the connecting rod 41 and is disposed on the side of the handle 30 facing away from the holder 10. The elastic pressing element 43 is sleeved on the connecting rod 41, is disposed between the positioning flange 415 and the handle 30, and is configured to press the handle 30 toward the clamping plate 15. The elastic pressing element 43 includes a spring cap 431 and a spring 433. The spring 433 is disposed between the positioning flange 415 and the handle 30 to push the handle 30 toward the clamping plate 15. The spring cap 431 is disposed between the positioning flange 415 and the spring 433 and surrounds the spring 433. Preferably, the fastener assembly 40 comprises a spacer 45 disposed between the elastic pressing element 43 and the handle 30. The spacer 45 may have a beveled surface 452 formed around an outer edge thereof at a side of the spacer 45 facing the handle 30.

Figure 4:
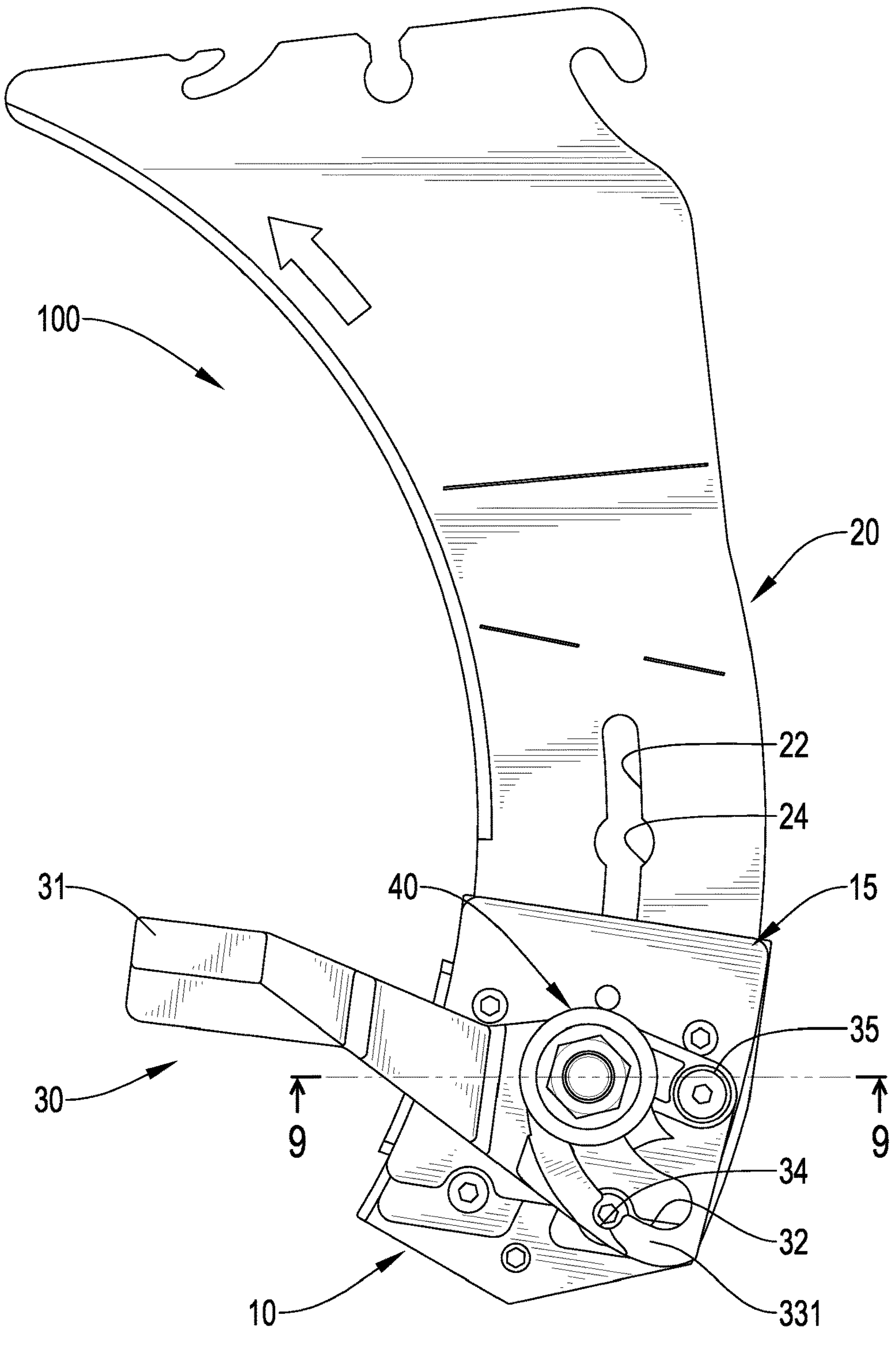
FIG. 4 is a front side view of the riving knife assembly in FIG. 1.
Figure 5:
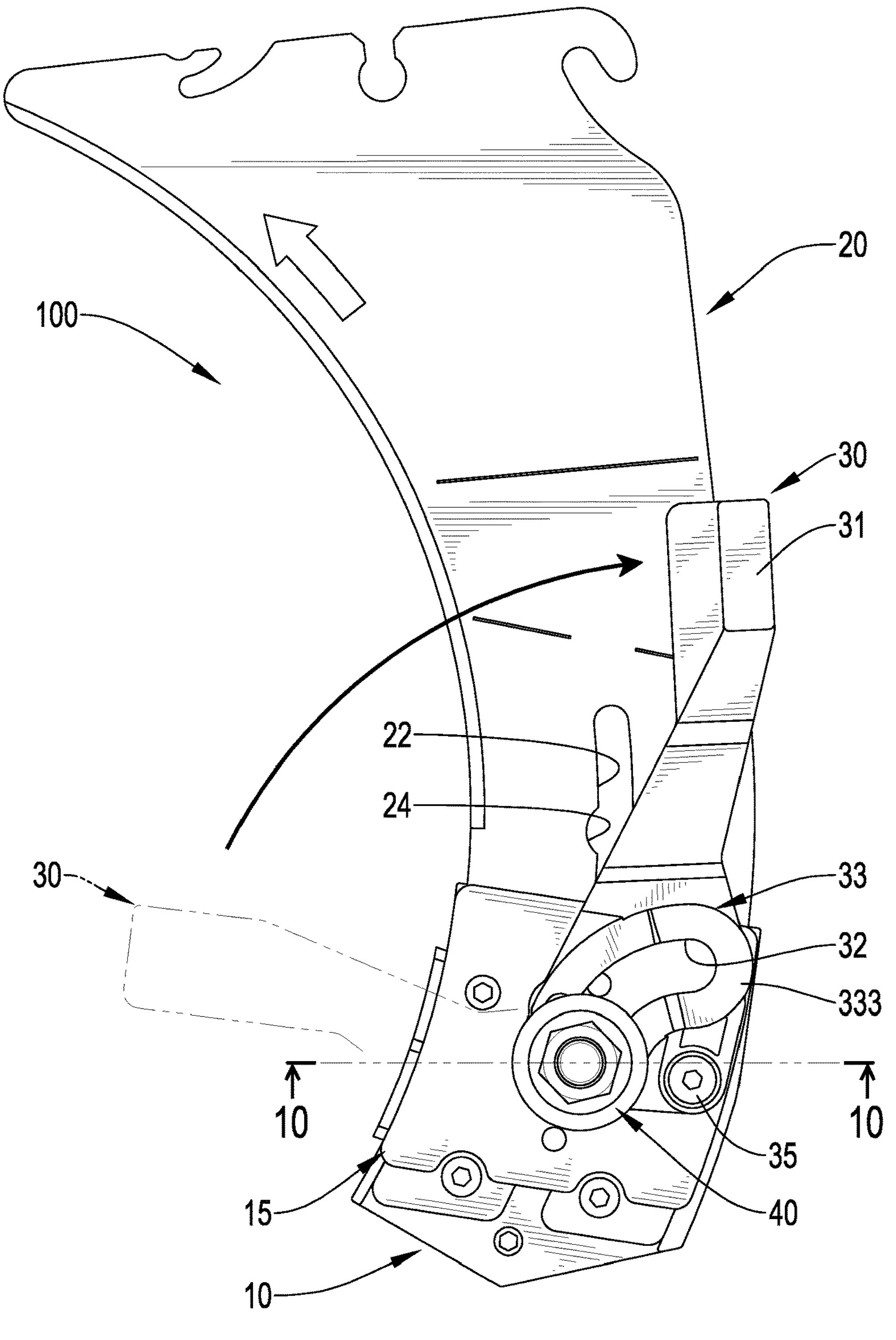
FIG. 5 is an operational front side view of the riving knife assembly in FIG. 4, showing that a handle is turned to an unlocked position.
Figure 9:
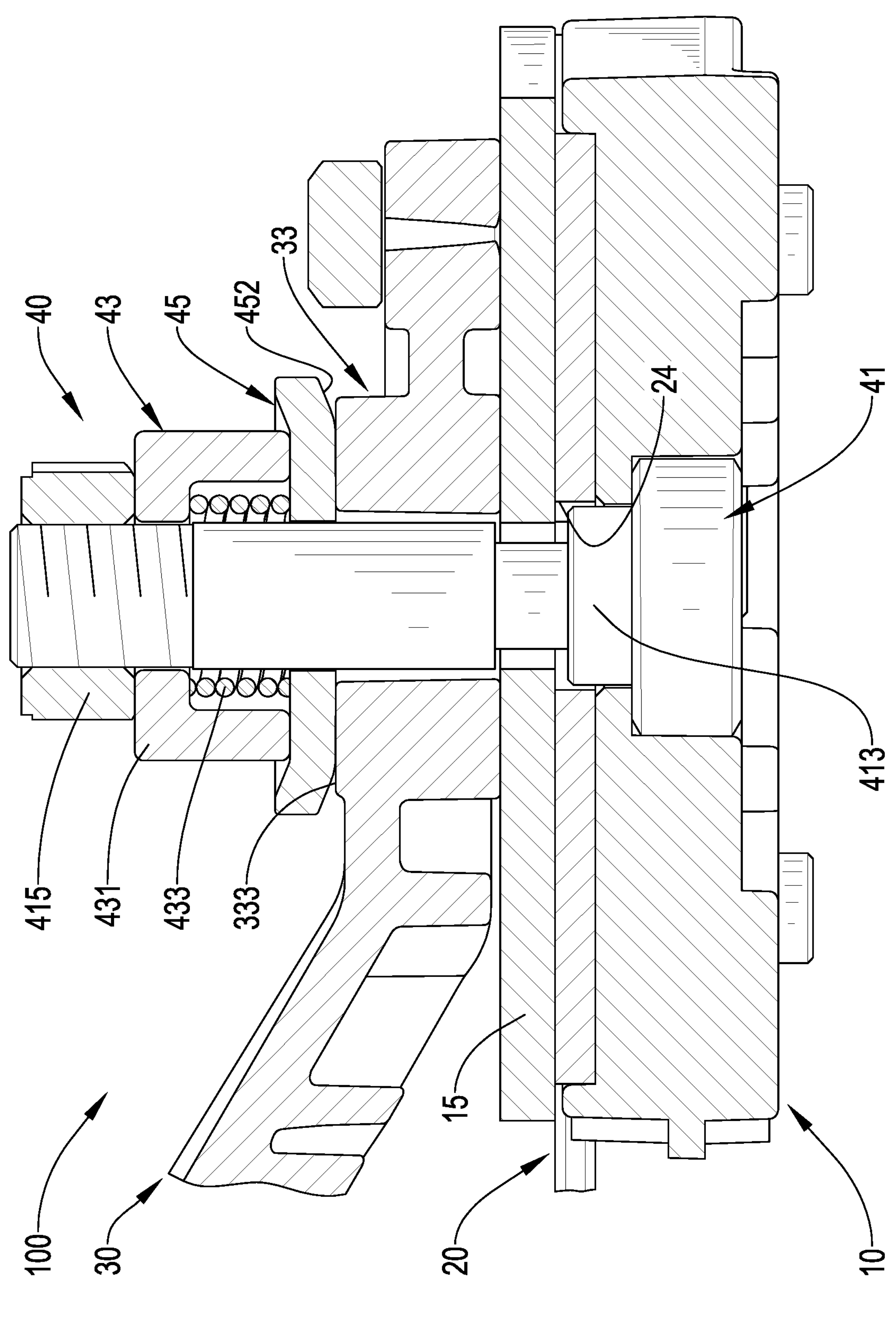
FIG. 9 is an enlarged bottom view in partial section of the riving knife assembly along line 9-9 in FIG. 4 showing that the handle is in the locked position.
Figure 10:
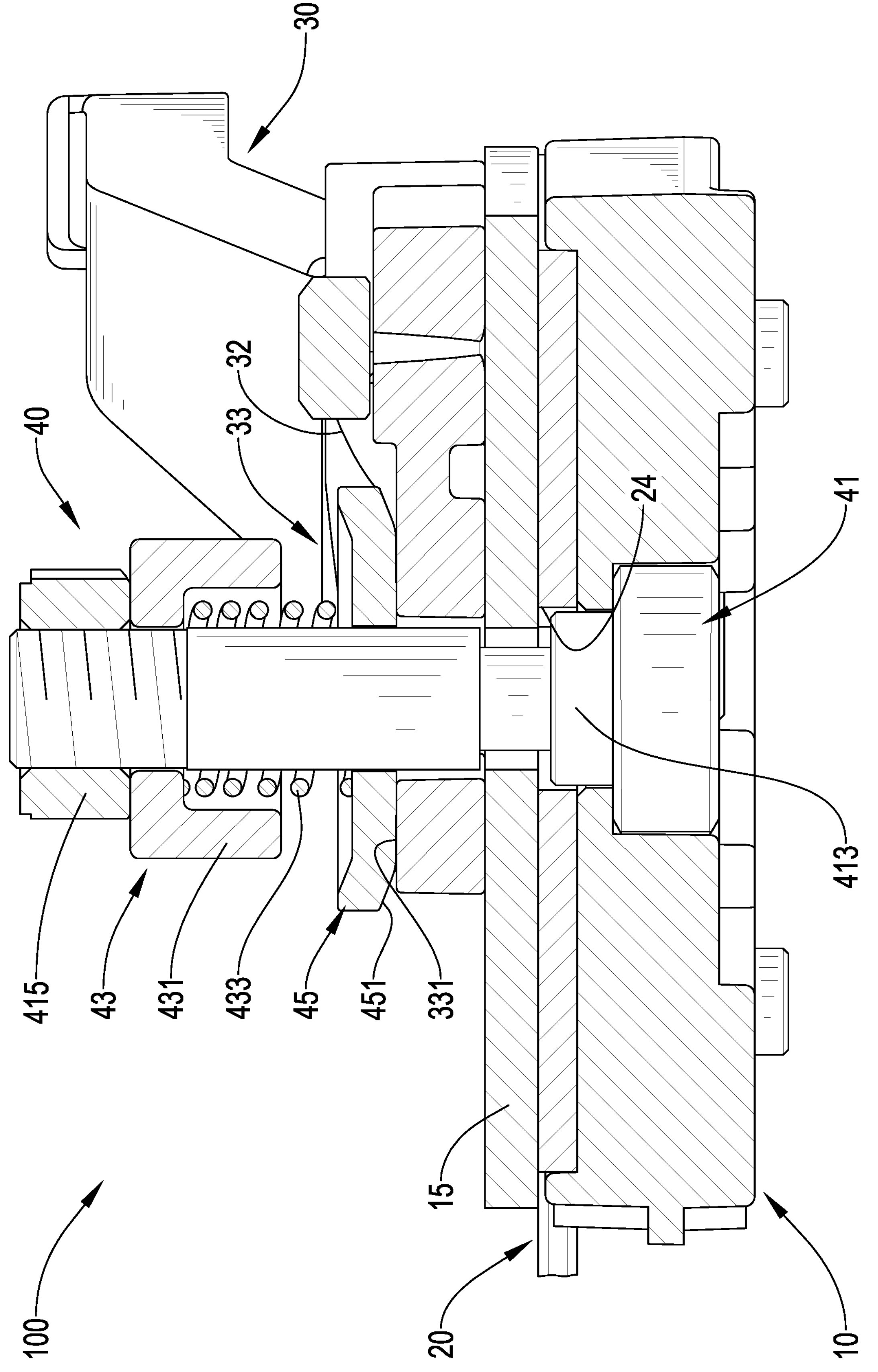
FIG. 10 is an enlarged bottom view in partial section of the riving knife assembly along line 10-10 in FIG. 5, showing that the handle is in the unlocked position.
Figure 11:
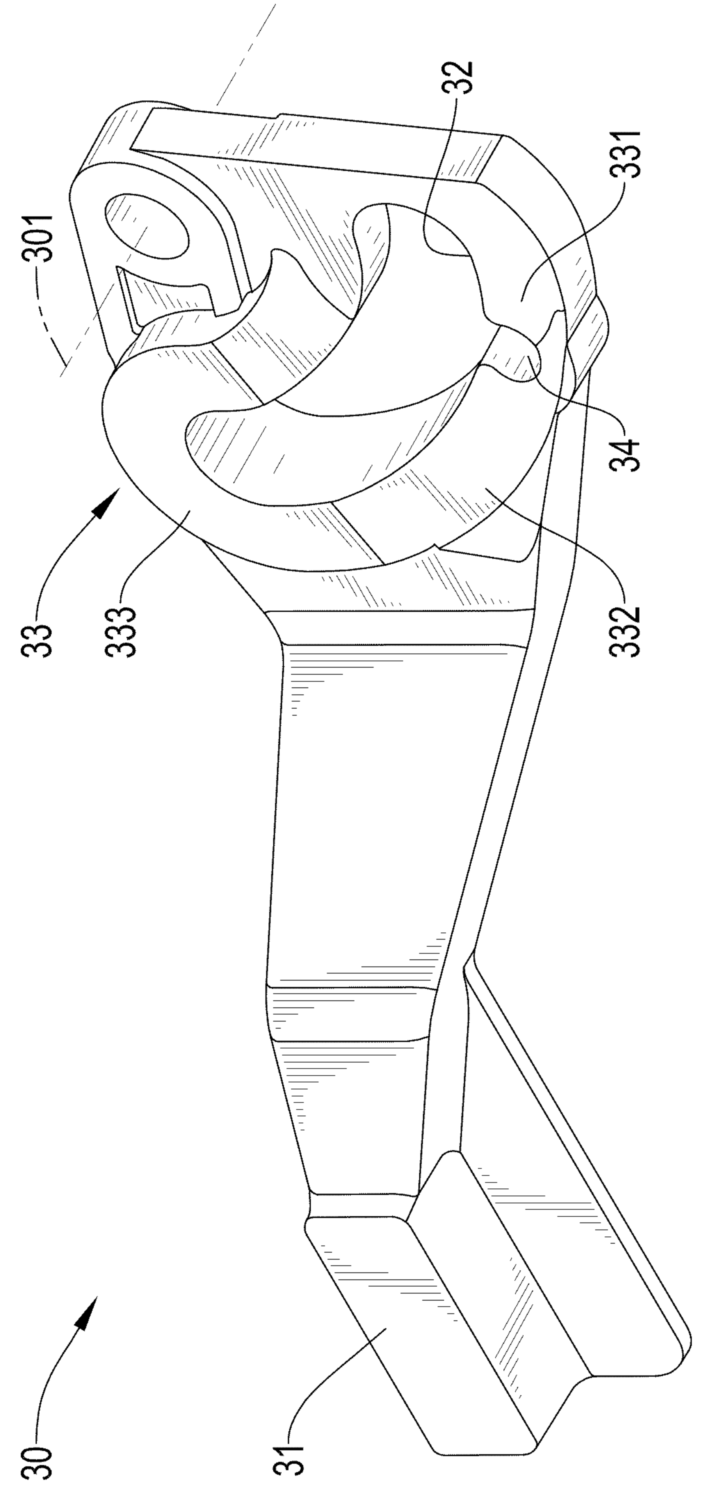
FIG. 11 is a perspective view of the handle of the riving knife assembly in FIGS. 3.

With reference to FIGS. 4, 5, 9, and 10, the handle 30 has a locked position as shown in FIGS. 4 and 9 and an unlocked position as shown in FIGS. 5 and 10.

Figure 8:
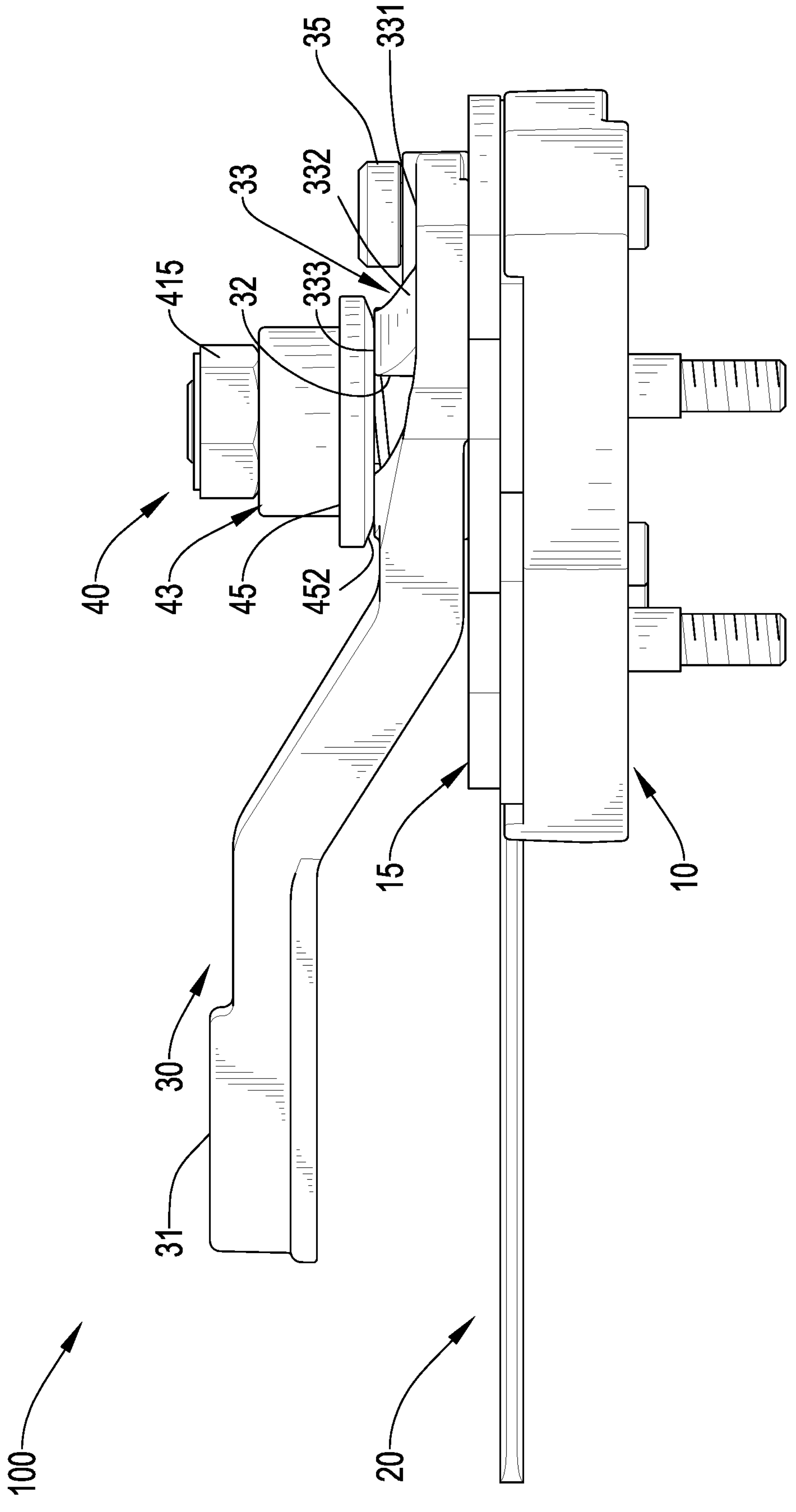
FIG. 8 is a bottom view of the riving knife assembly in FIG. 1.

As shown in FIGS. 4, 8, and 9, when the handle 30 is located in the locked position, the fastener assembly 40 is located at the locked end of the curved hole 32, and the elastic pressing element 43 is disposed between the positioning flange 415 and the upper step 333 of the stage 33 of the handle 30 to push the handle 30 toward the clamping plate 15. A total thickness of the spring cap 431 and the spacer 45 stacking with each other is approximately same as a distance from the upper step 333 of the stage 33 to the positioning flange 415, so the clamping plate 15 is pushed to tightly clamp the riving knife body 20 to fix the riving knife body 20 in position.

Figure 6:
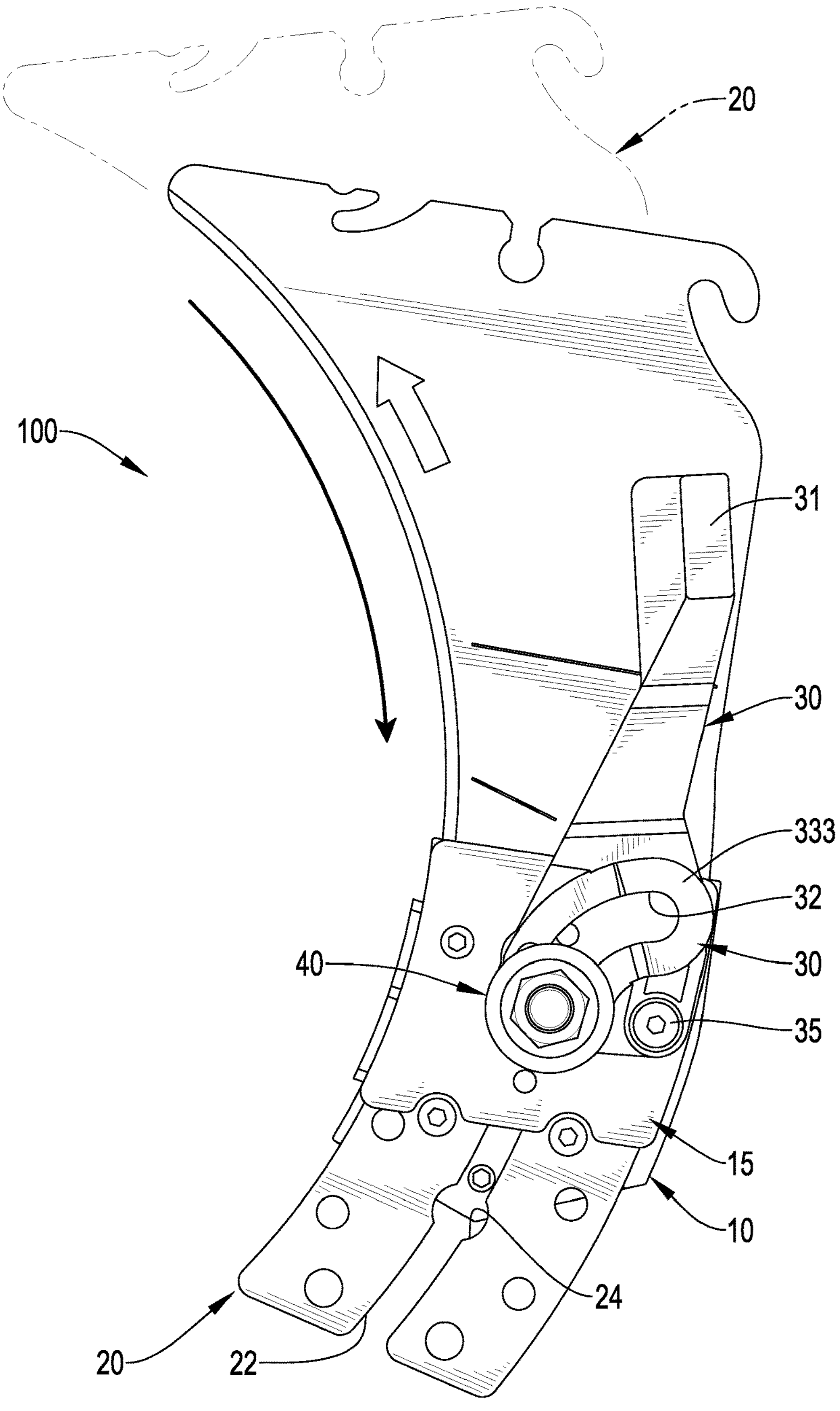
FIG. 6 is an operational front side view of the riving knife assembly in FIG. 4, showing that the riving knife body slides down relative to a holder.

As shown in FIGS. 5, 6, and 10, when the handle 30 is located in the unlocked position, the fastener assembly 40 is located at the unlocked end of the curved hole 32, and the elastic pressing element 43 is disposed between the positioning flange 415 and the lower step 331 of the stage 33 of the handle 30. As a distance between the lower step 331 and the clamping plate 15 is smaller than the distance between the upper step 333 and the clamping plate 15, the total thickness of the spring cap 431 and the spacer 45 stacking with each other is smaller than a distance from the positioning flange 415 to the lower step 331 of the stage 33. When the spring 433 is uncompressed, the handle 30 and the clamping plate 15 are able to be moved toward the positioning flange 415 and away from the riving knife body 20 to release the riving knife body 20. Therefore, the riving knife body 20 can be slid along the knife slot 22 relative to the fastener assembly 40 to adjust a position relative to the holder 10.

Figure 7:
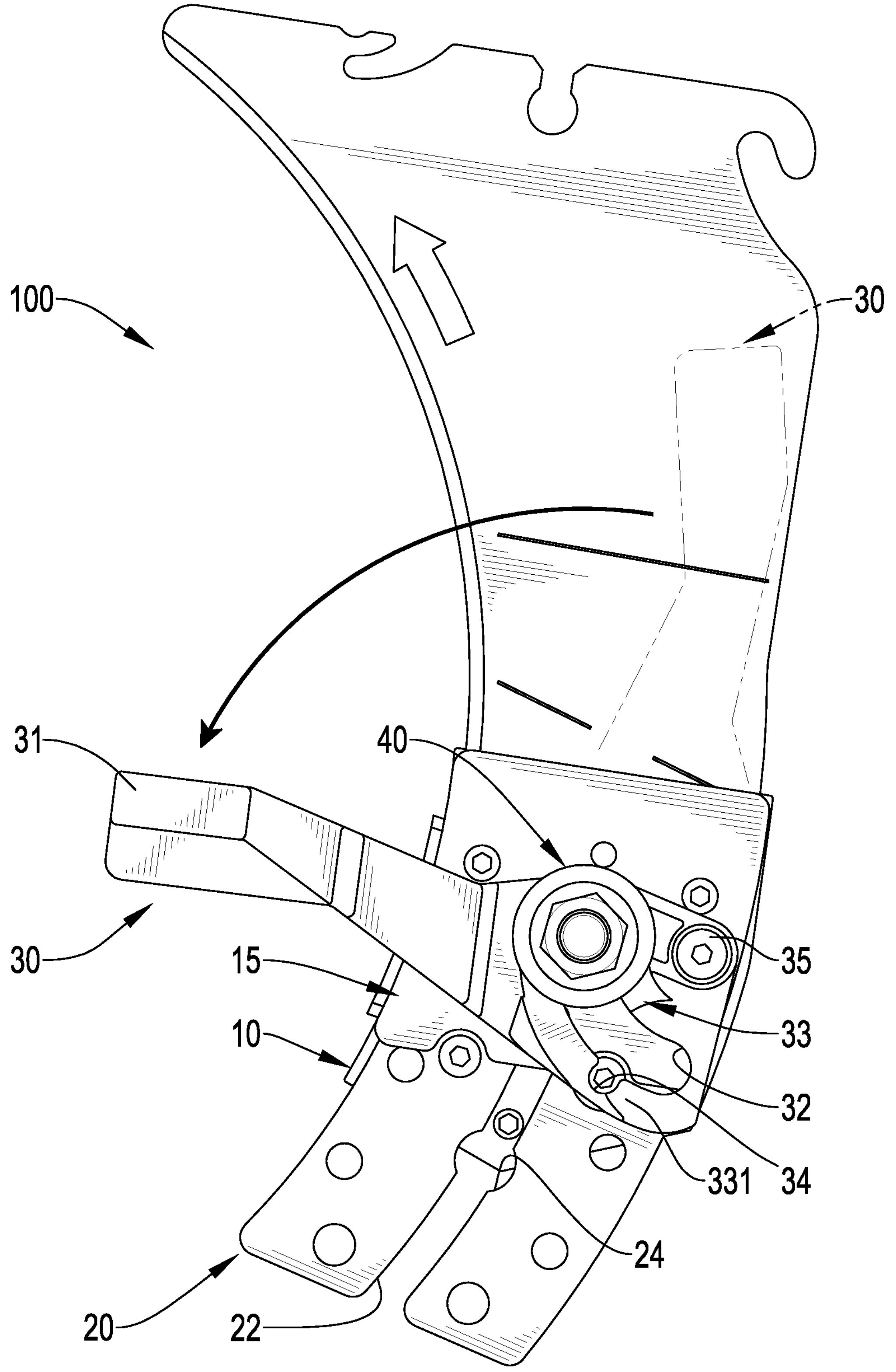
FIG. 7 is an operational front side view of the riving knife assembly in FIG. 4, showing that the handle is turned to a locked position.

With reference to FIG. 7, after adjusting the riving knife body 20 to a desired position, the handle 30 is turned to the locked position to clamp the riving knife body 20 in position.

Figure 3:
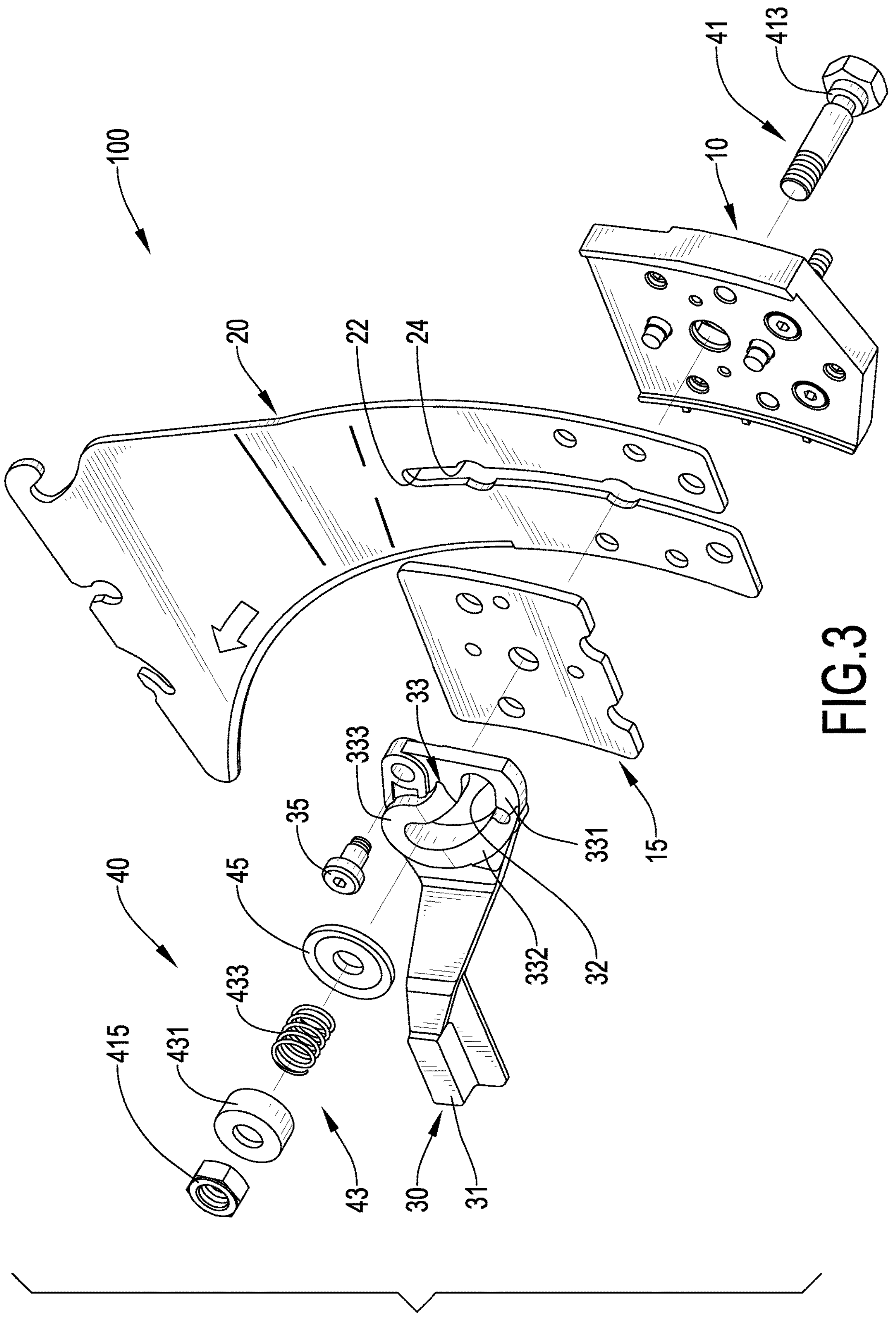

With reference to FIGS. 3, 4 and 9, preferably, the riving knife body 20 has multiple positioning holes 24 arranged along and communicating with the knife slot 22, and spaced apart from one another. Each positioning hole 24 has a diameter being larger than a width of the knife slot 22. The connecting rod 41 includes a mounting flange 413 selectively inserted into and engaged with one of the positioning holes 24 to fix a position of the fastener assembly 40 relative to the riving knife body 20.

With reference to FIGS. 3 and 4, preferably, the handle 30 includes a mounting notch 34 formed through the handle 30, recessed in a rim of the curved hole 32, communicating with the curved hole 32, and being adjacent to the lower step 331. A positioning element may be inserted through the mounting notch 34 to fix the handle 30 and to prevent the handle 30 from accidentally pivoting.

With reference to FIGS. 5, to 7, and 12, to make a through cut, the top of the riving knife body 20 is located higher than the top of the saw blade 91. The protective cover 95 is pivotable and shields the saw blade 91. To make a non-through cut, the saw blade 91 may be adjusted to move down relative to the table 92. The riving knife body 20 is adjusted to slide down relative to the holder 10 and the saw blade 91. The riving knife body 20 slides down to a position where a top of the riving knife body 20 is lower than a top of the saw blade 91. The protective cover 95 may be pivoted to locate behind the saw blade 91.

The handle 30 includes the stage 33 having the lower step 331 for releasing the riving knife body 20 and the upper step 333 for clamping the riving knife body 20, so when the handle 30 is turned to the unlocked position, the riving knife body 20 can slide along the knife slot 22 relative to the fastener assembly 40 to adjust a position of the riving knife body 20 relative to the holder 10. When the handle 30 is turned to the locked position, the riving knife body 20 is clamped in position.

As the stage 33 has a slope 332 between the lower step 331 and the upper step 333, the component of the fastener assembly 40 abutting against the handle 30, which is the spacer 45 in the embodiment, can smoothly slide along the slope 332 from the lower step 331 to the upper step 333 or from the upper step 333 to the lower step 331. In addition, the spacer 45 may have the beveled surface 452 facing the handle 30 and formed around the outer edge thereof to reduce contact between the outer edge of the spacer 45 and the surface of the stage 33 while the spacer 45 is sliding along the slope 332 of the stage 33.

As the knife slot 22 of the riving knife body 20 is formed through the riving knife body 20, the riving knife body 20 can be directly moved up to detach from the fastener assembly 40.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A riving knife assembly comprising:

a holder;

a clamping plate disposed at a side of the holder;

a riving knife body disposed between the holder and the clamping plate and having a knife slot formed through two opposite sides of the riving knife body;

a handle disposed at a side of the clamping plate facing away from the holder, the handle pivotally connected to the clamping plate, the handle being pivotable around a pivot axis and relative to the clamping plate, and the handle having a first side;

a second side opposite to the first side of the handle;

a curved hole extending around the pivot axis and having a locked end and an unlocked end;

a stage surrounding the curved hole, formed at the first side of the handle, and the stage having a lower step being adjacent to the unlocked end of the curved hole;

an upper step being adjacent to the locked end of the curved hole; and a thickness from the upper step to the second side of the handle being larger than a thickness from the lower step to the second side of the handle;

a fastener assembly connected to the holder, the riving knife body, the clamping plate, and the handle, and the fastener assembly comprising:

a connecting rod mounted through the holder, the knife slot of the riving knife body, the clamping plate, and the curved hole of the handle;

a positioning flange disposed at an end of the connecting rod and disposed at one of the first side and the second side of the handle that faces away from the holder; and an elastic pressing element sleeved on the connecting rod, disposed between the positioning flange and the handle, and configured to push the handle toward the clamping plate; wherein the handle has a locked position and an unlocked position;

when the handle is in the locked position, the fastener assembly is located at the locked end of the curved hole of the handle, and the elastic pressing element is located between the positioning flange and the upper step of the stage of the handle;

when the handle is in the unlocked position, the fastener assembly is located at the unlocked end of the curved hole of the handle, and the elastic pressing element is located between the positioning flange and the lower step of the stage of the handle.

2. The riving knife assembly as claimed in claim 1, wherein the elastic pressing element includes a spring and a spring cap;

the spring is disposed between the positioning flange and the handle; and the spring cap is disposed between the positioning flange and the spring and surrounds the spring.

3. The riving knife assembly as claimed in claim 2, wherein the stage of the handle includes a slope connected between the upper step and the lower step and gradually inclining from the upper step to the lower step.

4. The riving knife assembly as claimed in claim 3, wherein the fastener assembly comprises a spacer disposed between the elastic pressing element and the handle.

5. The riving knife assembly as claimed in claim 4, wherein the spacer has a beveled surface formed around an outer edge of the spacer at a side of the spacer facing the handle.

6. The riving knife assembly as claimed in claim 2, wherein the fastener assembly comprises a spacer disposed between the elastic pressing element and the handle.

7. The riving knife assembly as claimed in claim 6, wherein the spacer has a beveled surface formed around an outer edge of the spacer at a side of the spacer facing the handle.

8. The riving knife assembly as claimed in claim 1, wherein the stage of the handle includes a slope connected between the upper step and the lower step and gradually inclining from the upper step to the lower step.

9. The riving knife assembly as claimed in claim 8, wherein the fastener assembly comprises a spacer disposed between the elastic pressing element and the handle.

10. The riving knife assembly as claimed in claim 9, wherein the spacer has a beveled surface formed around an outer edge of the spacer at a side of the spacer facing the handle.

11. The riving knife assembly as claimed in claim 1, wherein the fastener assembly comprises a spacer disposed between the elastic pressing element and the handle.

12. The riving knife assembly as claimed in claim 8, wherein the spacer has a beveled surface formed around an outer edge of the spacer at a side of the spacer facing the handle.

13. The riving knife assembly as claimed in claim 1, wherein the knife slot of the riving knife body extends to a bottom of the riving knife body.

14. The riving knife assembly as claimed in claim 13, wherein the riving knife body has multiple positioning holes arranged along and communicating with the knife slot, and spaced apart from one another;

each of the positioning holes has a diameter being larger than a width of the knife slot; and the connecting rod includes a mounting flange selectively inserted into and engaged with one of the positioning holes.

15. The riving knife assembly as claimed in claim 1, wherein the riving knife body has multiple positioning holes arranged along and communicating with the knife slot, and spaced apart from one another;

each of the positioning holes has a diameter being larger than a width of the knife slot; and the connecting rod includes a mounting flange selectively inserted into and engaged with one of the positioning holes.

16. The riving knife assembly as claimed in claim 1, wherein the handle includes a mounting notch formed through the handle and communicating with the curved hole of the handle.

* * * * *